Feb. 27, 1951 C. W. NORTON ET AL 2,543,124

SHIFTABLE TYPE ORGANIZATION FOR TYPEWRITING MACHINES

Original Filed Aug. 10, 1946 7 Sheets-Sheet 1

INVENTORS
CHARLES W. NORTON
and JOHN H. RITZ
BY Ramsey, Kent & Chisholm
THEIR ATTORNEYS Feb. 27, 1951 C. W. NORTON ET AL 2,543,124

SHIFTABLE TYPE ORGANIZATION FOR TYPEWRITING MACHINES

Original Filed Aug. 10, 1946 7 Sheets-Sheet 2

INVENTORS
CHARLES W. NORTON
and JOHN H. RITZ
BY
Ramsey, Kent & Chisholm
THEIR ATTORNEYS Feb. 27, 1951 C. W. NORTON ET AL 2,543,124

SHIFTABLE TYPE ORGANIZATION FOR TYPEWRITING MACHINES

Original Filed Aug. 10, 1946 7 Sheets-Sheet 3

INVENTORS
CHARLES W. NORTON
and JOHN H. RITZ
BY
Ramsey, Kent & Chisholm
THEIR ATTORNEYS

SHIFTABLE TYPE ORGANIZATION FOR TYPEWRITING MACHINES

Original Filed Aug. 10, 1946 7 Sheets-Sheet 4

INVENTORS
CHARLES W. NORTON
and JOHN H. RITZ
BY
Ramsey, Kent & Chisholm
THEIR ATTORNEYS

SHIFTABLE TYPE ORGANIZATION FOR TYPEWRITING MACHINES

Original Filed Aug. 10, 1946 7 Sheets-Sheet 5

INVENTORS
CHARLES W. NORTON
and JOHN H. RITZ
BY
Ramsey, Kent & Chisholm
THEIR ATTORNEYS

SHIFTABLE TYPE ORGANIZATION FOR TYPEWRITING MACHINES

Original Filed Aug. 10, 1946

INVENTORS
CHARLES W. NORTON
and JOHN H. RITZ
BY
Ramsey, Kent + Chisholm
THEIR ATTORNEYS Feb. 27, 1951 C. W. NORTON ET AL 2,543,124

SHIFTABLE TYPE ORGANIZATION FOR TYPEWRITING MACHINES

Original Filed Aug. 10, 1946 7 Sheets-Sheet 7

INVENTORS
CHARLES W. NORTON
BY and JOHN H. RITZ
Ramsey, Kent & Chisholm
THEIR ATTORNEYS Patented Feb. 27, 1951

2,543,124

UNITED STATES PATENT OFFICE 2,543,124

SHIFTABLE TYPE ORGANIZATION FOR TYPEWRITING MACHINES

Charles W. Norton, West Orange, N. J., and John H. Ritz, Huntington, N. Y., assignors to Ralph C. Coxhead Corporation, New York, N. Y., a corporation of Delaware Original application August 10, 1946, Serial No. 689,754. Divided and this application April 11, 1947, Serial No. 740,878

14 Claims. (Cl. 197—49)

This invention relates to typewriting machines of the kind known in the trade as the "Varityper," in which an embossed type shuttle is moved about a circular anvil to present selected type at a common printing point.

This application is a division of copending application Serial No. 689,754, filed August 10, 1946, and has reference to mechanism whereby two type shuttles are mounted on a circular anvil, either shuttle being movable into operative position by the operation of a shift key.

In the form shown, the present invention is incorporated in a machine for typing messages in generally linear symbols of varying lengths, such as dot-and-dash symbols of the telegraphic code, the type messages being primarily intended to be used in the transmission of such messages.

The printing type is embossed upon a pair of shuttles which are movable as above described, a pigment ribbon being passed between the shuttle and the material to be printed upon, and the material being forced against the ribbon and type by a stroke from the printing hammer. A strip of paper tape or other material is fed upward past the printing point of the machine, the printed message being delivered as a continuous tape.

In the form of shuttle herein disclosed, there is a single row of type symbols embossed upon the surface of the shuttle, the shift key serving to bring a different shuttle into position at the printing point rather than having a double row of type symbols embossed on the shuttle and providing for registering the second row of symbols with the printing point by operation of the shift key. This construction is used herein partly because some of the code symbols extend for a considerable length. However, a greater selection of fonts of type could be secured in conventional type symbols by employing the mechanism herein disclosed, each shuttle being displaceable along its axis to register any of a plurality of rows of type with the printing point.

It is an object of the invention to adapt a typewriter mechanism of the "Varityper" type so as to mount a plurality of type-carrying shuttles which are selectively moved into position at the printing point and connected for operation by the type keys by operation of the shift key.

Another object of the invention is to provide mechanism operated by a shift key for transposing shuttles mounted on an anvil and engaging the shuttle positioned at the printing point with the shuttle arm.

A further object of the invention is to improve generally mechanism of the type described.

Further objects and objects relating to details and economies of construction and operation will more definitely appear from the detailed description which follows.

Our invention is clearly defined in the appended claims. In the claims, as well as in the description, parts are at times identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming part of this specification, in which:

This typewriting machine, which is adapted for the typing of characters of varying lengths such as telegraphic code messages which do not require capitalization and some other characters of ordinary printing, has thirty keys arranged in three banks of ten keys each. Eleven of these keys are utilized by means of shift keys for the typing of additional symbols.

Figure 2:
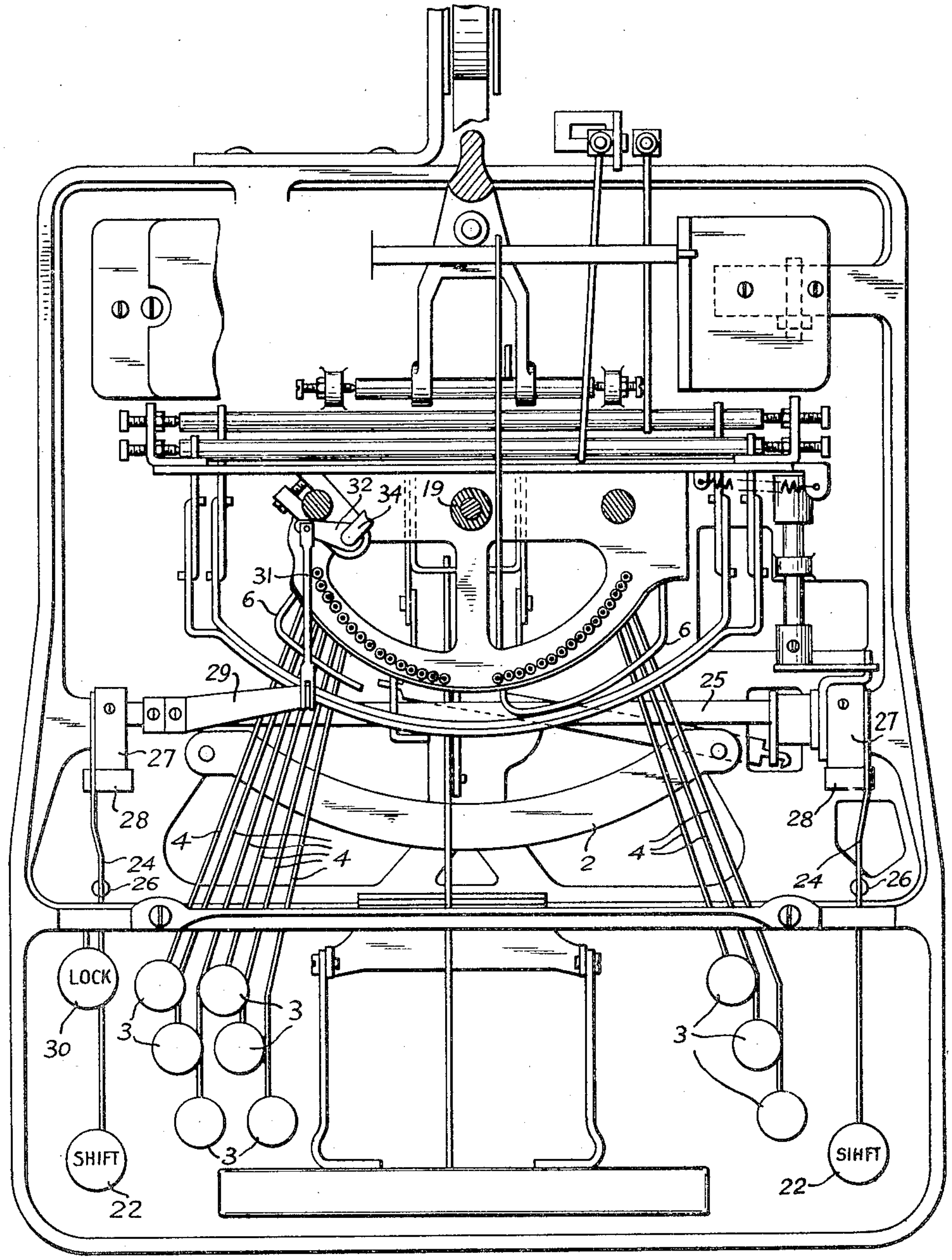
Fig. 2 is a plan and horizontal sectional view of the typewriter.
Figure 3:
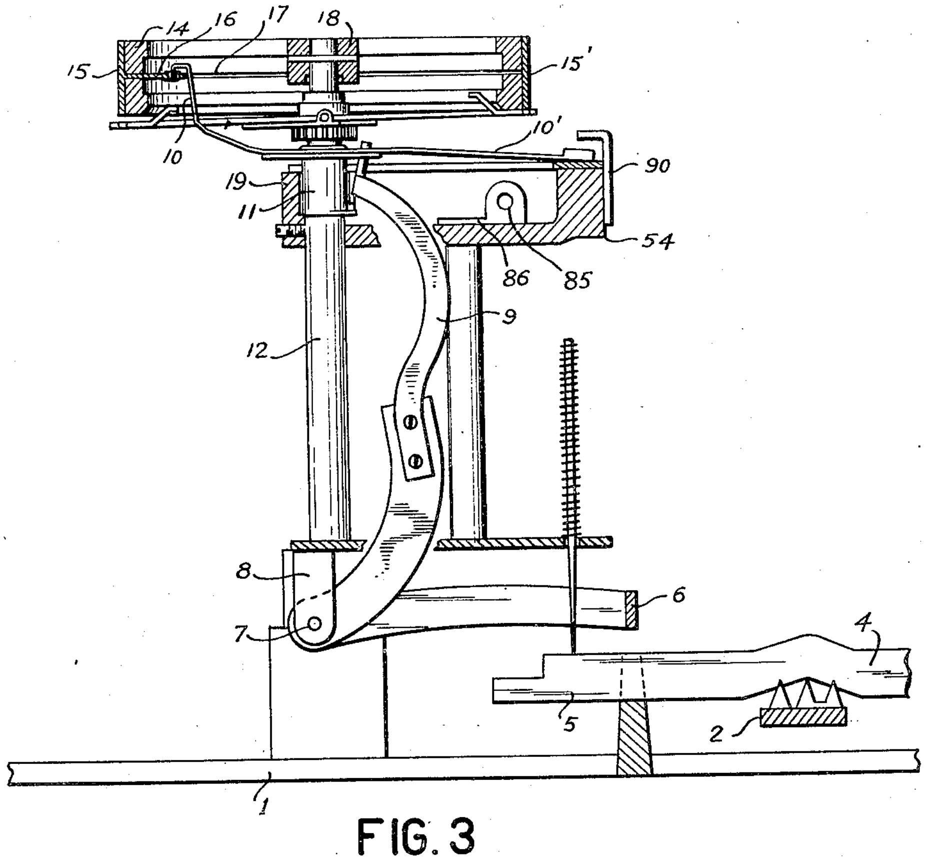
Fig. 3 is a vertical section through the type-selecting device, taken in general on line 3—3 of Fig. 1.
Figure 4:
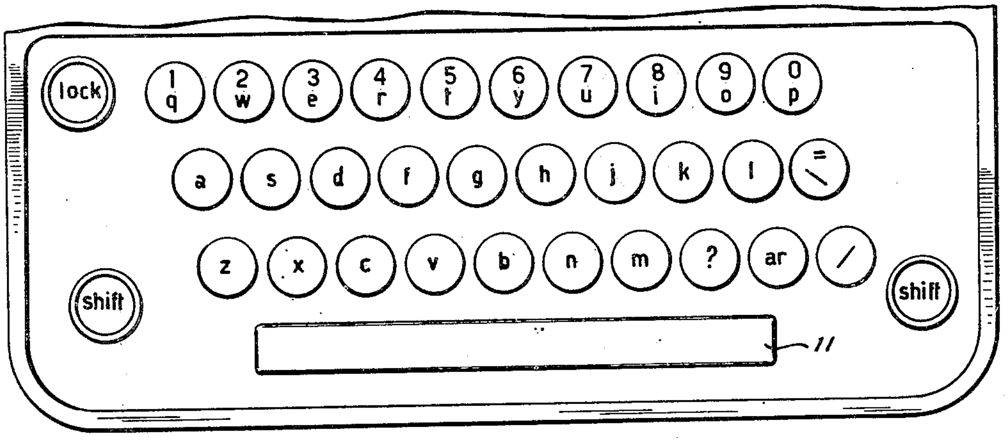
Fig. 4 is a schematic view of the keyboard.

The arrangement of the keyboard is shown diagrammatically in Fig. 4. The key levers are arranged in two groups, on opposite sides of the center of the machine, and are pivoted on an arcuate pivot bar 2 which is secured in the frame 1 (see Figs. 1, 2 and 3). The rear ends 5 of the key levers pass under and beyond a universal bar 6, hereinafter described. There are two universal bars 6, one overlying the key levers on each side of the center of the machine.

Inasmuch as the structure of the universal bars 6 and connecting mechanism is similar, a description of one is sufficient, it being understood that each acts through intermediate mechanism to move a type shuttle 15 or 15' to the right or left relative to the printing point, at which the midpoint of the shuttle normally stands. The universal bar 6 (see Fig. 3) comprises a bail-like frame pivoted on a shaft 7 secured in a stationary bracket 8. An upstanding arm 9 is rigidly secured to the bar 6 and acts upon a shuttle arm 10 to oscillate it about a shaft 12 and position the type shuttle 15 or 15' so that the symbol corresponding to the depressed key will be brought to the printing point for reception of the printing hammer stroke, as hereinafter described. The above-described mechanism in arrangement is in general the same as that disclosed in the patent to Trego No. 1,967,273 of July 24, 1934, to which reference is made for a more detailed description of this conventional arrangement.

While the mechanism for type selection is in general similar to that of the above-mentioned patent to Trego, the shuttle arm 10 has a modified mounting in the machine which permits ready disengagement from its connection with either of the type shuttles 15 and 15'. The two type shuttles 15 and 15' are mounted on a stationary circular anvil 14 supported by a fixed shaft or column 12. The column 12 rotatably mounts a sleeve 11 which constitutes the pivot for oscillation of the arm 10. The sleeve 11 is not only oscillated on the shaft 12, but also reciprocated thereon by means of a lug or flange 11'. The sleeve 11 passes through an aperture 19 in the main frame 1, which aperture has an internal circumferential groove (not shown) to permit the flange 11' to be oscillated by the axis of the shaft 12. The aperture 19 also has an axial groove on one side to permit the flange 11' to be reciprocated. The purpose of this modification of the type selection mechanism will be apparent from the following description.

*Key shift mechanism*

The typing of telegraphic code symbols of the dot-and-dash character requires that the various symbols be of lengths corresponding to the groups of dots and dashes which compose them. They have, therefore, various lengths not reducible to the uniform letter spacing of ordinary typewriting machines. When embodying such type in a machine using a type shuttle, it has been found expedient to space the type at equal angular distances on the shuttle, as is usual in the "Varityper," and to arrange the normally longitudinal dimension of the type along vertical lines. This construction makes it impracticable to accomplish the function of shift keys by raising or lowering the shuttle axially, as heretofore, to bring a different type case into position. Instead of raising or lowering the type shuttle as in the usual "Varityper," first and second type shuttles 15 and 15' are made use of, which are shifted horizontally around the anvil 14, thereby removing one shuttle from the printing point and substituting the other therefor; which shifting of shuttles is accomplished through the operation of the usual shift keys.

Figure 1:
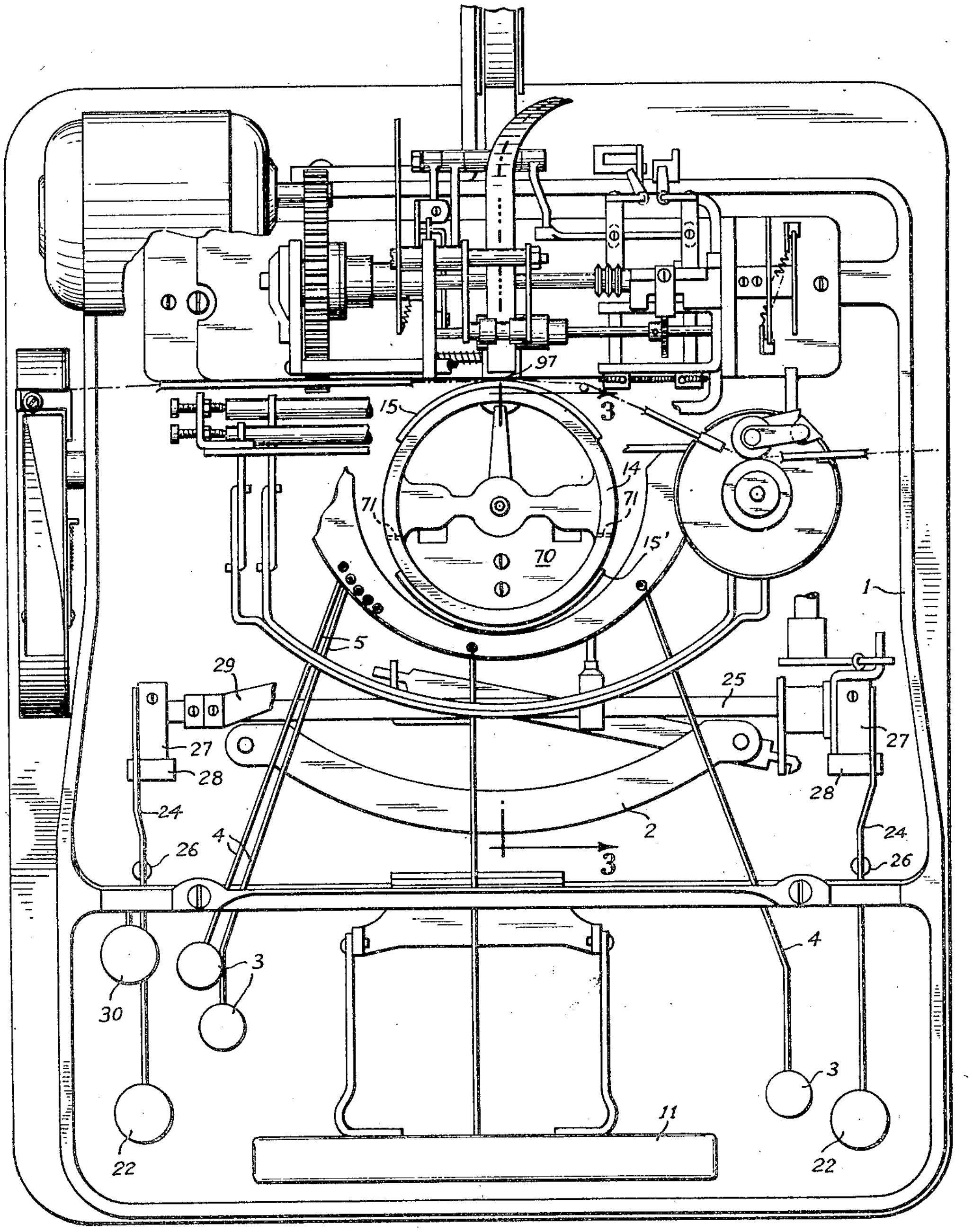
Fig. 1 is a top plan view of the code writing machine, parts being omitted and other parts broken away to show the general arrangement of the operating parts.

Referring to Fig. 1, it will be seen that the shift keys 22 are provided with key levers 24, which are loosely supported on a rock shaft 25, mounted for oscillation in the sides of main frame 1. The shift key levers 24 are limited in their downward movement by stop screws 26, and oscillate the shaft 25 by means of arms 27 projecting from said shaft, each arm 27 having an engaging portion 28 extending under the shift key levers 24 so that depression of the key lever 24 oscillates the shaft 25. The shaft 25 also has an arm 29 projecting therefrom at the left side of the machine and connected with a mechanism for shifting the shuttles about the anvil 14 (see Figs. 1 and 2). The arm 29 is pivotally connected by means of a link 31 (see Fig. 2) to an arm 32 projecting from a vertical rock shaft 34, which has a driving element for interchanging the first and second shuttles 15 and 15' about the anvil 14. A conventional shift lock 30 may be used, if desired, to hold the left-hand shift key lever in its depressed position, thereby holding the entire shuttle-shifting mechanism in the position to which it has been moved by depression of the shift key lever 24.

The shuttles 15 and 15' (see Fig. 5), having respective fins 16 and 16' projecting from the back thereof, are positioned on the periphery of the anvil 14 with the fins lying in a circumferential slot 17 in anvil 14. Both of the shuttles have, on their bottom edges, engaging means such as the lugs 35, 35' projecting downwardly. The shuttle 15 carries on its outer face the printing type for all symbols to be printed normally; that is, when the shift keys are not being used. The second shuttle 15' carries type for symbols to be printed when the shift keys are depressed.

Figure 7:
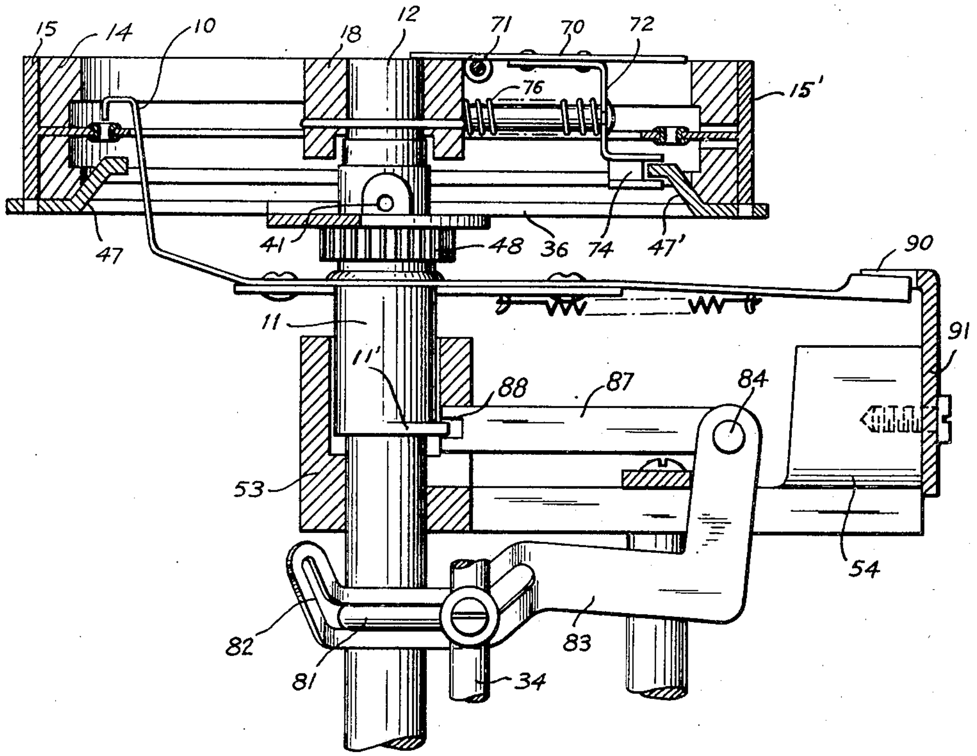
Fig. 7 is a view similar to Fig. 5 but showing parts thereof in a different operating position.
Figure 8:
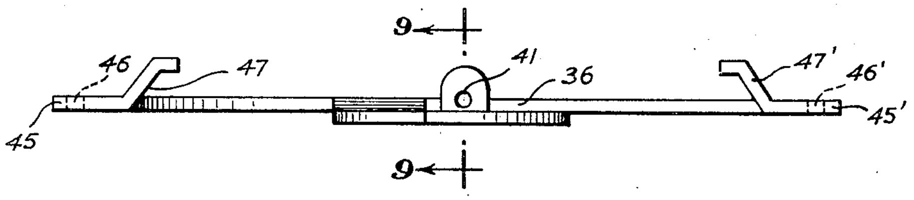
Fig. 8 is an elevational view of the shuttle-shifting yoke shown in plan in Fig. 11.
Figure 9:
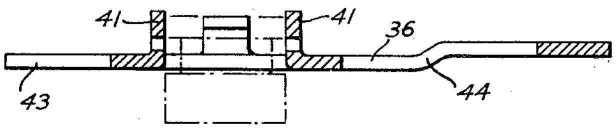
Fig. 9 is a sectional view of the shuttle-shifting yoke taken in general on line 9—9 of Fig. 8, showing the pivotal connection of the shifting pinion to the yoke, and showing in dot-and-dash lines the pinion positioned in the yoke.

A yoke 36 which may be formed of sheet metal (shown in Figs. 6, 7, 8 and 11) is provided for cooperation with the shuttles to accomplish the shifting operation. The yoke 36 is an arcuate member, preferably of substantially 180° in extent, and is of such radius as to conform to the periphery of the circular anvil 14, about the center of which it oscillates. An arm 37 (see Fig. 11) of the yoke 36 extends parallel to and spaced slightly from the middle radius of the yoke 36 and has at one side an enlarged rounded portion 38 concentric with the yoke. The enlarged portion 38 has an elongated opening 40 therein at the center of the yoke 36. The longer diameter of the opening 40 coincides with the line joining the extremities of the yoke 36, and the shorter diameter is perpendicular thereto, passing through the center of the yoke. Upstanding lugs 41 project from the edge of the opening 40 at the terminals of the shorter diameter and are apertured for the reception of pivot pins 42,42. The arm 37 is offset from the plane of the yoke 36 by an angular portion 44 so that the axes of pins 42,42 coincide and lie in the plane of the upper surface of the yoke 36 (see Figs. 8 and 9). The arm 37 has an extension 43 projecting beyond the enlarged portion 38. A pinion 48 (see Figs. 5, 6 and 7) is mounted in lugs 41 of the yoke 36 by means of the pins 42,42 and has a central bore for the reception of the shaft 12 upon which it is adapted to oscillate and reciprocate, thereby oscillating and reciprocating the yoke 36. The yoke 36 is provided with tongues 47 and 47' which extend inwardly and upwardly (see Figs. 5 and 7).

Figure 5:
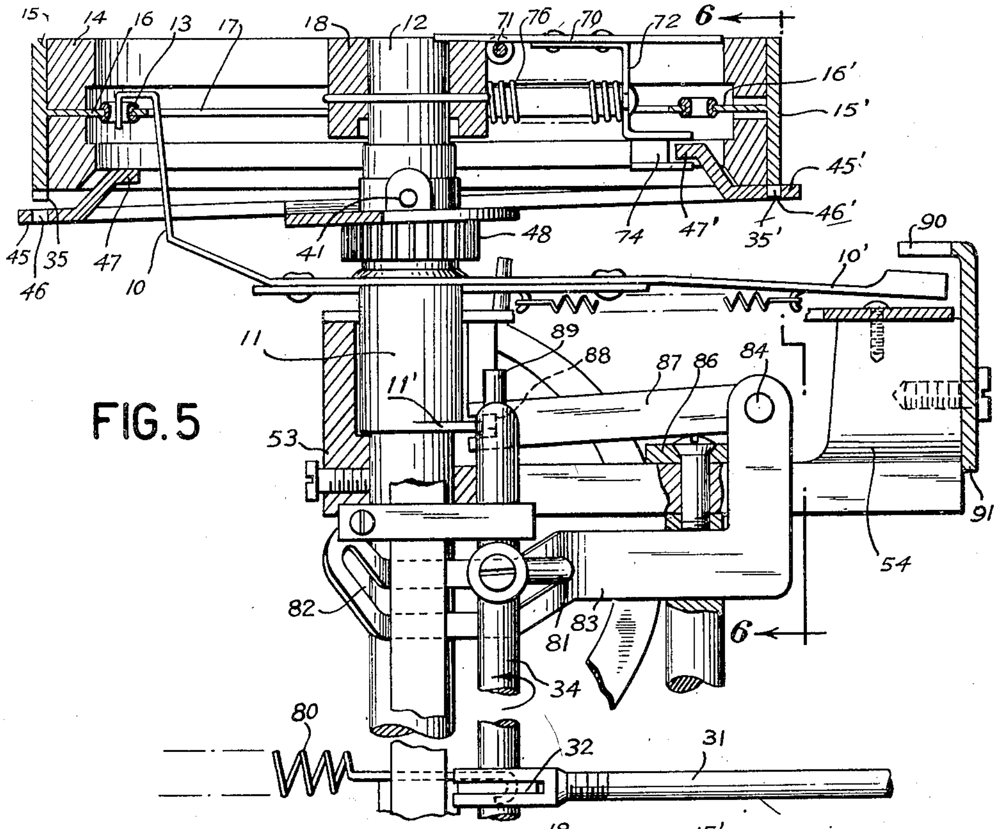
Fig. 5 is an elevation of the shuttle shifting mechanism viewed from the left side of Fig. 1, partly in section taken generally on line 5—5 of Fig. 11, with parts omitted and other parts sectioned for clearness of illustration.

Projections 45 and 45' are formed at the ends of the yoke 36, extend outward, and have suitable means for engaging the shuttles 15 and 15', such as apertures 46 and 46', to receive lugs 35 and 35' on the bottom edges of shuttles 15 and 15'. As shown in Fig. 5, the projection 45' is in engagement with the lug 35' of shuttle 15', which lug extends into the aperture 46', while the projection 45 is shown disengaged from the lug 35, the yoke having a slightly tilted position relative to anvil 14. Engagement of the projection 45' with the lug 35' of the second shuttle 15' serves to retain that shuttle in the fixed position on anvil 14, while the first shuttle 15 is free to be moved about the anvil 14 within a limited arcuate range under control of the key levers 24 and the shuttle arm 10 to bring the selected type to the printing point. Thus, the shuttle 15, in its normal position, is free to be moved to the right and left about the axis of the anvil 14 while the shuttle 15' is immovably locked in position by the engagement of the yoke 36 with the shuttle 15'.

Figure 6:
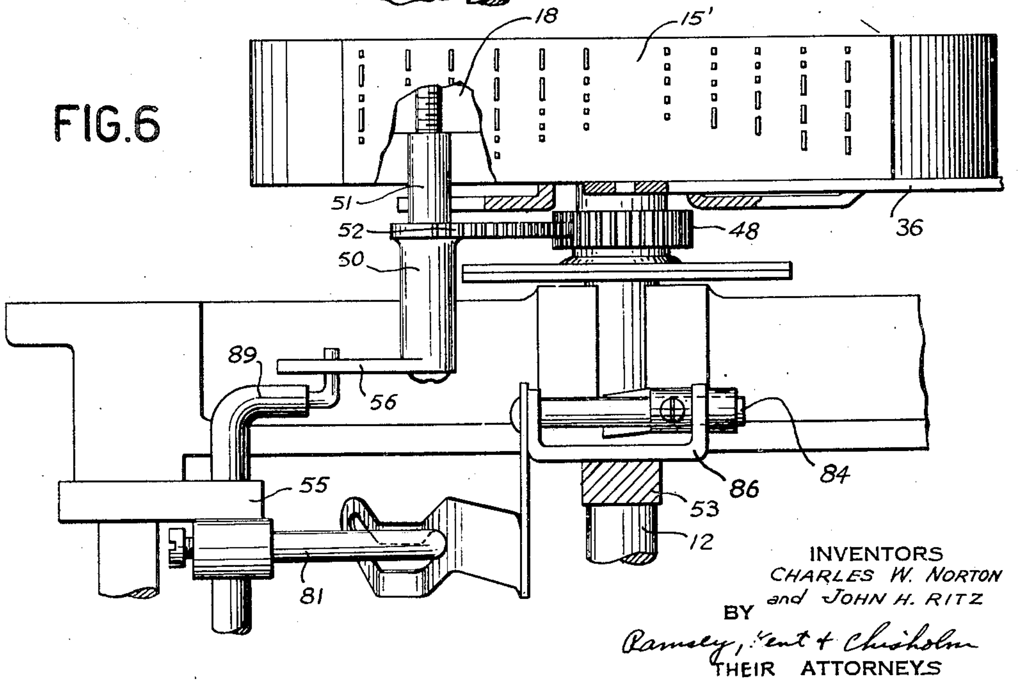
Fig. 6 is an elevation and section taken generally on line 6—6 of Fig. 5 of the mechanism shown in Fig. 5 viewed from the front of Fig. 1, showing parts omitted from Fig. 5.
Figure 10:
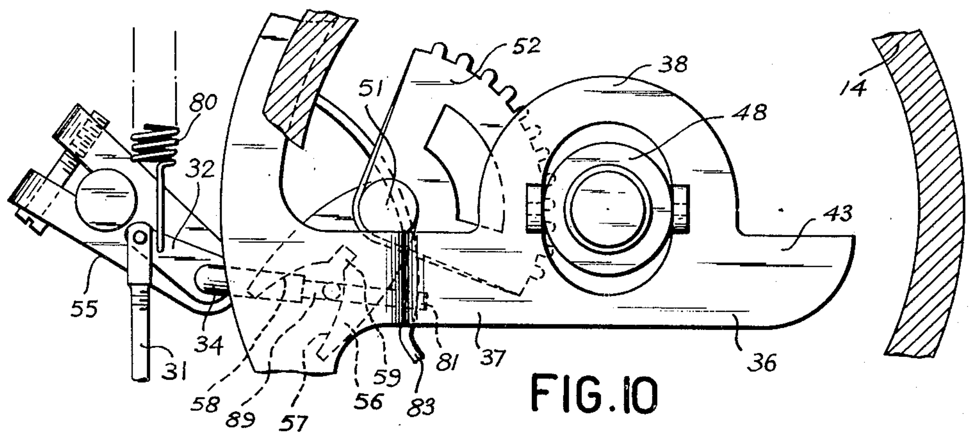
Fig. 10 is a detail plan view of mechanism for operating the shifting pinion.
Figure 11:
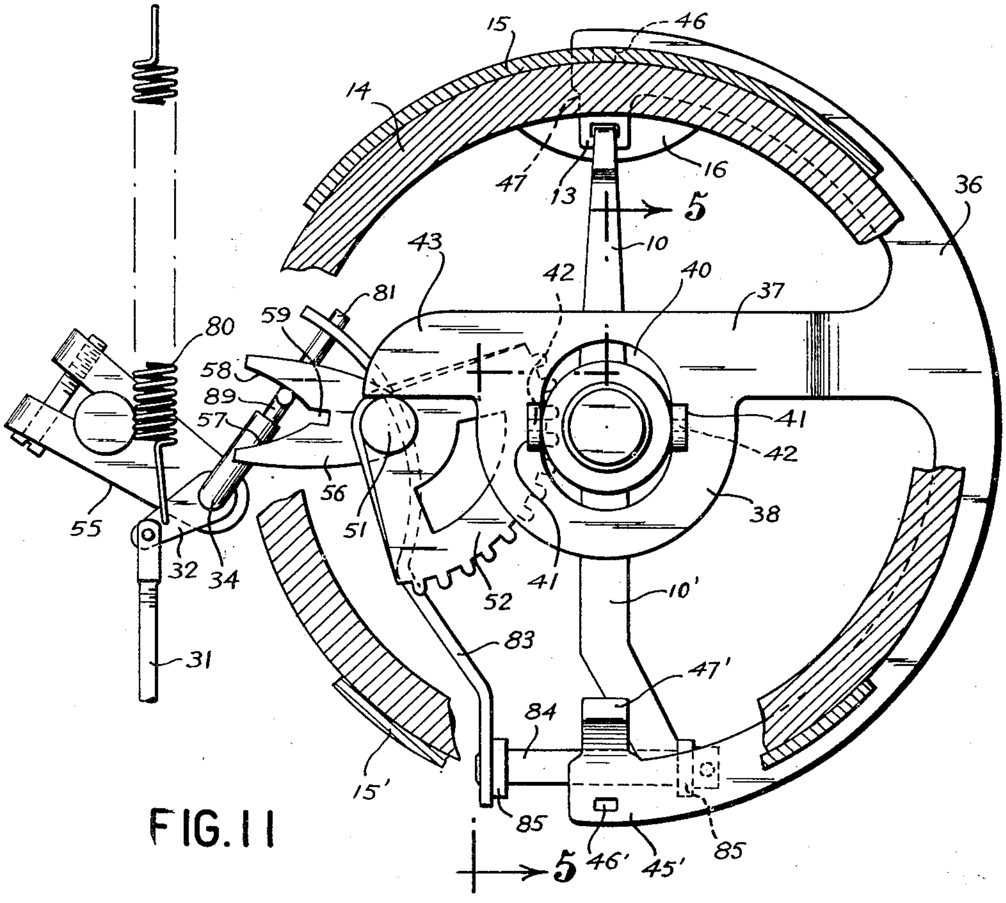
Fig. 11 is a similar view of the parts shown in Fig. 10 and related parts operated thereby, in a different operating position.

The pinion 48, which is connected to the yoke 36, can oscillate only within the limitation imposed by that yoke, 180° in the form shown. To produce that oscillation, a segment sleeve 50 (Fig. 6) is journaled on a stub shaft 51 secured in the underside of a fixed cross arm 18, and carries a segment gear 52, which meshes with the pinion 48. As shown in Figs. 6, 10 and 11, a cam fork 56 projects from the sleeve 50 serving as the operating arm therefor.

The yoke 36 is retained in engagement with the shuttle 15' and out of engagement with the shuttle 15 when in the normal position by means of a resilient spring plate 70 (see Fig. 5) which is pivoted by pin 71 on an axis parallel with the cross arm 18. The spring plate 70 has a fork bracket 72 secured to the underside thereof and adapted to engage either of the tongues 47 or 47' of the yoke 36 when positioned adjacent a fork 74 at the extremity of the bracket. When the yoke 36 is in the position shown in Fig. 5, the pressure of the spring 76 against the bracket 72 biases fork 74 and tongue 47' upwardly, thereby tilting the yoke 36 and holding it in contact with the anvil 14 adjacent the shuttle 15'. In order to remove the shuttle 15' from the anvil 14, the yoke adjacent lug 35' may be depressed by a downward pressure on the spring plate 70, thereby freeing shuttle 15'. Similarly, the shuttle 15 may be removed after actuation of the shift lock 30.

When the projection 45' is retained in engagement with the shuttle 15', as in the normal typing position, the weight of the yoke 36 and the pinion 48 causes the projection 45 to drop downwardly out of engagement with the lug 35 of shuttle 15. At the same time, the shuttle arm 10 is held down into engagement with the shuttle 15, a portion thereof passing through an aperture 13 in the fin 16, and is vertically controlled by the shaft 34 and the intermediate mechanism during operation of the printing key.

In order to maintain the shuttle 15 in normal operating position, a spring 80 biases the arm 32 to the left as viewed in Fig. 5, which biases the shaft 34 in the direction of the arrow, clockwise when viewed from the top. The shaft 34, in turn, biases a projecting member 81, which is radial to shaft 34, to the right end of the cam slot 82 in an arm 83 of the bell crank lever composed of the arm 83, a pivot shaft 84 and an arm 87. The arms 83 and 87 are rigidly secured to the shaft 84 which is journaled in bearings 85 in a bracket 86 secured to a projection 54 of the stationary cross arm 53. The conformation of the arm 83 (Fig. 11) is such that the portion thereof containing the cam slot 82 is curved in an arc concentric with the axis of vertical rock shaft 34. The arm 87 has a forked end 88 engaging the lug 11' at the lower end of sleeve 11. Thus, the tension of the spring 80 operates to draw and hold the shuttle arm 10 downward into engagement with the fin 16 of the type shuttle 15. In this position, depression of a type key operates in the usual way to oscillate the type shuttle 15 and bring the selected type to the printing point, the yoke 36 offering no hindrance to such movement.

If it is desired to type a symbol positioned on the second shuttle 15', which requires operation of the shift key, that operation, acting through the arm 29 will draw the link 31 to the right as viewed in Fig. 5 (forward as viewed in Fig. 10), thereby oscillating the shaft 34 in a counterclockwise direction against the bias of the spring 80 and turning the member 81 in a similar direction. This movement of the member 81 (see Fig. 7), acting in the cam slot 82, raises the arm 83, thereby raising the arm 87 of the bell crank lever and the sleeve 11 by means of the fork 88 and the lug 11'. By this motion, the sleeve 11 not only lifts shuttle arm 10 out of engagement with the opening in the fin 16 of shuttle 15, but the sleeve 11 contacts the pinion 48, lifting the pinion and the lugs 41 to lift the yoke 36. Since the yoke 36 is already in contact with the anvil 14 adjacent the projection 45', it can rise no higher at that point but the remainder of yoke 36 will be raised to a horizontal position in which the projection 45 is in engagement with the lug 35 of the shuttle 15 adjacent the printing point, which lug then extends through the aperture 46.

At the same time that the shuttle arm 10 is lifted out of engagement with the fin 16 of the shuttle 15, the opposite end 10' of that arm is lifted into engagement with a fork 90 on the upper end of a detent 91 secured on the projection 54, thereby accurately positioning and holding the arm 10 against rotary movement during transposition of the shuttles. As the member 81 enters the horizontal portion of the cam slot 82, the shuttle arm 10 is held stationary by the interengagement of the fork 90 with the end 10' of the arm 10. The member 81 may continue to move in the horizontal portion of the cam slot 82 without producing any further upward movement of the shuttle arm 10. The rock shaft 34, however, has an arm 89 fixed to its upper end beyond the bearings 55, the structure and function of which will be apparent by reference to Figs. 6 and 11. During that movement, the arm 89, which is fixed to the vertical rock shaft 34 and rotates therewith, passes idly in a counterclockwise direction over the surface 57 of the cam fork 56 (see Fig. 10) which surface 57, during that movement, is concentric with the axis of the rock shaft 34. When the member 81, by its movement, has freed the shuttle 15 from the shuttle arm 10 and connected the yoke 36 with both of the shuttles 15 and 15', the vertical portion of arm 89 enters the notch 59 in the cam fork 56, during which time further movement of the member 81 in the horizontal portion of the cam slot 82 is an idling movement.

Upon further movement of the arm 89 in a counterclockwise direction, the vertical portion of that arm enters the notch 59 and contacts the sides of that notch to oscillate the segment sleeve 50 and the segment gear 52 in a clockwise direction. This movement oscillates the pinion 48 in a counterclockwise direction, oscillating the yoke 36 and the shuttles 15 and 15' therewith until the arm 37 of the yoke 36 contacts the opposite side of the stub shaft 51 and the arm 89 passes into contact with the curved surface 58 of the cam fork 56, which surface has now become concentric with the rock shaft 34.

During this movement of the yoke 36 through 180°, it has been held in close proximity with the anvil 14 by means of the arm 83, the arm 87, the fork 88, and the pinion 48, so that the shuttles 15 and 15' have been continuously engaged by the projections 45 and 45' and shifted to diametrically opposite sides of the anvil 14, thereby interchanging their positions relative to the printing point. Further movement of the arm 89 causes no change in the angular position of the yoke 36, but securely locks it in position while passing idly over the curved surface 58. Member 81, engaging the inclined portion of the cam slot 82, depresses the arm 83 and, through the intermediate action heretofore described, lowers the sleeve 11, thereby engaging the shuttle arm 10 with the aperture in fin 16' of the second shuttle 15' and lowering the yoke 36, thereby disengaging projection 45' from shuttle 15' and leaving it free to be oscillated by the shuttle arm 10 in the typing operation.

Figure 12:
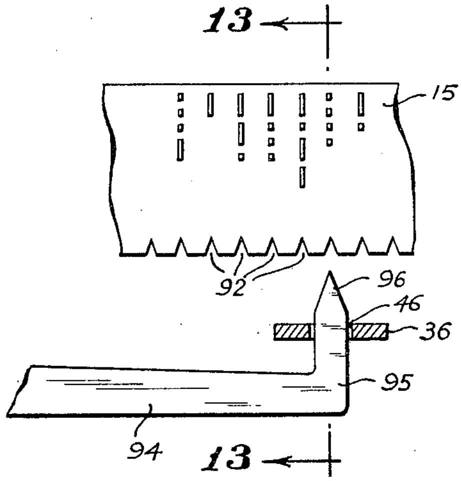
Fig. 12 is a detailed elevational view from the rear of the machine showing the shuttle and type locking device whereby the type is locked at the printing point during the printing operation.
Figure 13:
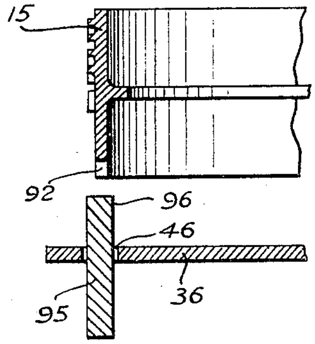
Fig. 13 is a detailed sectional view of the type locking device taken on the line 13—13 of Fig. 12.

To insure accurate positioning of the type characters on the message tape, it is desirable that the type be mechanically positioned and held immovable at the instant the printing hammer strikes to make the impression. Accordingly, a notch 92 (see Figs. 12 and 13) is provided in the lower edge of the printing shuttles 15 and 15' corresponding to each symbol. A type lock 94 has an upturned portion 95 with an edge or point 96 extending upwardly through the aperture 46 (or 46') in the yoke 36 to enter the appropriate notch 92 at the printing point after selection of the proper symbol, thereby immovably locking the type shuttle 15 or 15' in position at the instant of printing. This type lock is actuated into locking position upon release of the printing hammer to form the type impression.

The paper tape is fed upwardly past the printing point 97 and a pigment ribbon is progressed past the printing point and between the tape and the shuttle 15 or 15'. A hammer, which is released by actuation of any of the printing keys 3, strikes the back of the tape and drives it against the ribbon and the shuttle to form the printed impression.

The herein-described typewriter progresses the tape past the printing point varying amounts, depending on the space required by the particular symbol printed. The space requirement of a symbol printed when a shift key 22 is depressed may be different from that of the symbol printed by the same key 3 when the shuttle 15 is in normal position. Hence, means, more particularly described in the above-mentioned parent application, is provided and actuated by operation of a shift key 22 for varying the spacing action taking place upon depression of a printing key 3.

An understanding of the details of operation of the balance of the machine, which is completely set forth in the parent application, above mentioned, is not necessary for a complete understanding of the action of the shuttle shifting mechanism, above described.

It is to be understood that while the invention is described herein as applicable to a typewriting machine of a kind known as "Varityper," it is capable in its broader aspects of use with other kinds of typewriting machines and is to be understood as limited in its scope only as indicated in the appended claims. Further, while in the description reference has been made to use of this machine for typing of dot-and-dash symbols of the telegraphic code, it is equally applicable for the typing of any symbols of varying lengths, and certain features of the invention are equally applicable to typewriters generally.

We claim:

1. In a typewriting machine, the combination of an anvil having a cylindrical surface, a type shuttle slidably mounted on said surface for movement relative to a common printing point, means for indexing said shuttle to present characters at the printing point, a second shuttle slidably mounted on said surface circumferentially of the first-mentioned shuttle, means normally to retain said second shuttle in fixed position, and a shift key and associated mechanism operated thereby for transposing said shuttles.

2. In a typewriting machine having a keyboard, the combination of a fixed anvil having an arcuate surface, a type shuttle slidably mounted on said surface for oscillatory movement past a common printing point, means for indexing said shuttle to present characters at the printing point, a second shuttle slidably mounted on said surface circumferentially of the first-mentioned type shuttle, means normally to retain said second shuttle in fixed position, and means operable from the typewriter keyboard to transpose said shuttles.

3. In a typewriting machine, the combination of a fixed circular anvil having a cylindrical surface, a first type shuttle slidably mounted on said surface for movement relative to a common printing point, means for indexing said shuttle to present characters at the printing point, a second shuttle slidably mounted on said surface circumferentially of the first type shuttle, means normally to retain said second shuttle in fixed position, and a shift key and associated mechanism for removing the first type shuttle from the printing point and substituting the second type shuttle therefor.

4. In a typewriting machine, the combination of a fixed circular anvil having a cylindrical surface, a type shuttle slidably mounted on said surface for movement relative to a common printing point, means for indexing said shuttle to present characters at the printing point, a second shuttle slidably mounted on said surface circumferentially of the first-mentioned shuttle, means normally to retain said second shuttle in fixed position, and a shift key and associated mechanism for disengaging said shuttle indexing means and said shuttle retaining means, transposing said shuttles, and reengaging said shuttle-indexing means and said retaining means, the first shuttle becoming fixed and the second shuttle becoming under control of said shuttle indexing means.

5. In a typewriting machine, the combination of a fixed anvil having a cylindrical surface, a type shuttle slidably mounted on said anvil surface for oscillatory movement past a common printing point, means for indexing said shuttle to present characters at the printing point, a second type shuttle slidably mounted on said surface circumferentially of the first-mentioned shuttle, means normally to retain said second shuttle in fixed position, means operative from the typewriter keyboard for disengaging the shuttles from the indexing means and retaining means, transposing said shuttles and reengaging the shuttles with the indexing means and retaining means, the first shuttle becoming fixed and the second shuttle becoming under control of said shuttle indexing means, and means for locking the shuttle indexing means against indexing movement during transposition of the shuttles.

6. In a typewriting machine, the combination of a fixed anvil having a cylindrical surface, a first type shuttle slidably mounted on said anvil surface for oscillatory movement past a common printing point, means for indexing said shuttle to present characters at the printing point, a second type shuttle slidably mounted on said surface circumferentially of the first type shuttle, means normally to retain said second shuttle in fixed position, means operative from the typewriter keyboard for disengaging the shuttles from the indexing means and retaining means, removing the first shuttle from the printing point and substituting the second shuttle therefor and reengaging the shuttles with the indexing means and retaining means, the first shuttle becoming fixed and the second shuttle becoming under control of said shuttle indexing means, and means for locking the shuttle indexing means against indexing movement during transposition of the shuttles.

7. In a typewriting machine, the combination of a fixed anvil having a cylindrical surface, a type shuttle slidably mounted on said surface for oscillatory movement past a common printing point, means for indexing said shuttle to present characters at the printing point, a second type shuttle slidably mounted on said surface circumferentially of the first-mentioned shuttle, means normally to retain said second shuttle in fixed position, means operative from the typewriter keyboard for disengaging the shuttle indexing means and shuttle retaining means, transposing said shuttles and reengaging the shuttle indexing means and shuttle retaining means, the first shuttle becoming fixed and the second shuttle becoming under control of said shuttle indexing means, and means for locking the shuttle indexing means against indexing movement during transposition of the shuttles.

8. In a typewriting machine, the combination of an anvil having a cylindrical surface, a type shuttle slidably mounted on said surface for movement relative to a printing point, an indexing arm to index said shuttle for selectively presenting characters at the printing point, a second shuttle slidably mounted on said surface, a shuttle transposing member engageable simultaneously with both of said shuttles, and means operable from the typewriter keyboard for oscillating said member so as to transpose said shuttles and restoring said member to return the shuttles to normal position.

9. In a typewriting machine, the combination of an anvil having a cylindrical surface, a type shuttle slidably mounted on said surface for movement relative to a printing point, an indexing arm to index said shuttle for selectively presenting characters at the printing point, a second shuttle slidably mounted on said surface, a shuttle transposing member pivotally mounted for oscillation on the axis of said anvil surface and engageable simultaneously with both of said shuttles, and means operable from the typewriter keyboard for oscillating said member through an angle of substantially 180° so as to transpose said shuttles and restoring said member to return the shuttles to normal position.

10. In a typewriting machine, the combination of a fixed anvil having a cylindrical surface, a type shuttle slidably mounted on said surface for oscillatory movement past a common printing point, means for indexing said shuttle to present characters at the printing point, a second type shuttle slidably mounted on said anvil surface, a member mounted beneath said shuttles, and means for raising said member into engagement with said shuttles, rotating said member so as to remove the first-mentioned type shuttle from the printing point and substitute the second shuttle, and lowering said member from engagement with said shuttles.

11. In a typewriting machine having a keyboard, the combination of a fixed anvil having a cylindrical surface, a type shuttle slidably mounted on said surface for oscillatory movement past a common printing point, means for indexing said shuttle to present characters at the printing point, a second type shuttle slidably mounted on said anvil surface, a member mounted beneath said shuttles, and means operable from the typewriter keyboard for raising said member into engagement with said shuttles, rotating said member so as to remove the first-mentioned type shuttle from the printing point and substitute the second shuttle, and lowering said member from engagement with said shuttles.

12. In a typewriting machine, the combination of a fixed anvil having a cylindrical surface, a first type shuttle slidably mounted on said surface for oscillatory movement past a common printing point, means for engaging the first shuttle and indexing it to present characters at the printing point, a second type shuttle slidably mounted on said anvil surface circumferentially of the first shuttle, and means operable from the typewriter keyboard for displacing the shuttle-indexing means from engagement with the first shuttle, transposing the shuttles and engaging the shuttle-indexing means with the second shuttle.

13. In a typewriting machine, the combination of a fixed anvil having a cylindrical surface, a first type shuttle slidably mounted on said surface for oscillatory movement past a common printing point, means for engaging the first shuttle and indexing it to present characters at the printing point, a second type shuttle slidably mounted on said anvil surface circumferentially of the first shuttle, a shuttle-transposing member extending adjacent both shuttles, and means operable from the typewriter keyboard for displacing the shuttle-indexing means from engagement with the first shuttle, engaging the shuttle-transposing member with both shuttles, operating the shuttle-transposing member to transpose the shuttles, disengaging the shuttle-transposing member from the second shuttle and engaging the shuttle-indexing means therewith.

14. In a typewriting machine, the combination of an anvil having a cylindrical surface, a first type shuttle slidably mounted on said surface for oscillatory movement past a common printing point, means to index the first type shuttle for presenting selected characters at the printing point, a second type shuttle slidably mounted on said anvil surface circumferentially of the first shuttle, a shuttle-shifting key on the typewriter keyboard, and means operated by depression of the shuttle-shifting key for freeing the first shuttle from the indexing means, transposing the shuttles and engaging the second shuttle with the indexing means and upon release of the shuttle-shifting key for effecting reverse action so as to restore the first shuttle to operation at the printing point.

CHARLES W. NORTON.
JOHN H. RITZ.

REFERENCES CITED

The following references are of record in the file of this patent:

UNITED STATES PATENTS

| Number | Name | Date |
|---|---|---|
| 682,759 | Sears | Sept. 17, 1901 |
| 707,548 | Campbell | Aug. 26, 1902 |
| 710,089 | Williams | Sept. 30, 1902 |
| 794,851 | Campbell | July 18, 1905 |
| 860,876 | Lord | July 23, 1907 |
| 1,056,159 | Emeliantzeff | Mar. 18, 1913 |
| 1,093,575 | Lopez | Apr. 14, 1914 |